(12) United States Patent
Shahar et al.

(10) Patent No.: US 12,282,775 B2
(45) Date of Patent: Apr. 22, 2025

(54) NETWORK DEVICE WITH PROGRAMMABLE ACTION PROCESSING

(71) Applicant: MELLANOX TECHNOLOGIES, LTD., Yokneam (IL)

(72) Inventors: Ariel Shahar, Jerusalem (IL); Avi Urman, Yokneam (IL); Omri Kahalon, Yehud (IL); Uria Basher, Nehusha (IL); Doron Haim, Herzliya (IL); Sagi Farjun, Modiin (IL)

(73) Assignee: Mellanox Technologies, Ltd, Yokneam (IL)

( * ) Notice: Subject to any disclaimer, the term of this patent is extended or adjusted under 35 U.S.C. 154(b) by 58 days.

(21) Appl. No.: 18/321,013

(22) Filed: May 22, 2023

(65) Prior Publication Data

US 2024/0394060 A1 Nov. 28, 2024

(51) Int. Cl.
*G06F 9/30* (2018.01)
*G06F 9/38* (2018.01)

(52) U.S. Cl.
CPC ........ *G06F 9/30145* (2013.01); *G06F 9/3867* (2013.01)

(58) Field of Classification Search
None
See application file for complete search history.

(56) References Cited

U.S. PATENT DOCUMENTS

| | | | |
|---|---|---|---|
| 10,841,243 B2 | 11/2020 | Levi et al. | |
| 11,258,885 B2 * | 2/2022 | Urman | H04L 12/4641 |
| 2016/0216971 A1 * | 7/2016 | Grochowski | G06F 9/3888 |
| 2017/0064047 A1 * | 3/2017 | Bosshart | H04L 49/3009 |
| 2018/0329711 A1 * | 11/2018 | Ghiya | G06F 9/384 |
| 2021/0176345 A1 * | 6/2021 | Urman | H04L 69/22 |
| 2024/0146703 A1 * | 5/2024 | Shicht | H04L 9/0637 |

OTHER PUBLICATIONS

'Forwarding Metamorphosis: Fast Programmable Match-Action Processing in Hardware for SDN' Copyright 2013 ACM. (Year: 2013).*
Machine Translation of Korean Patent Application KR 20100063024 A, 2010. (Year: 2010).*
'Re-Configurable Match-Action Tables (RMT)—Lecture 16, Computer Networks (198:552)' Fall 2019, Rutgers University. (Year: 2019).*

* cited by examiner

*Primary Examiner* — Steven G Snyder
(74) *Attorney, Agent, or Firm* — Meitar Patents Ltd.; Daniel Kligler

(57) ABSTRACT

A network device includes one or more ports, match-action circuitry, and an action processor. The one or more ports are to exchange packets between the network device and a network. The match-action circuitry is to match at least some of the packets to one or more rules so as to set respective actions to be performed, at least one of the actions including a programmable action. The instruction processor is to perform the programmable action by running user-programmable software code. The instruction processor includes architectural registers, one or more of the architectural registers being accessible by the match-action circuitry, and the match-action circuitry is to write into the architectural registers information for performing the programmable action.

18 Claims, 3 Drawing Sheets

NETWORK DEVICE WITH PROGRAMMABLE ACTION PROCESSING

FIELD OF THE INVENTION

The present invention relates generally to network devices, and particularly to methods and systems for match-action processing in network devices.

BACKGROUND OF THE INVENTION

Match-action processing is a common building block used in network devices. A match-action operation typically attempts to match packet attributes to a set of rules, and, upon finding a match, selects an action to be applied to the packet. Actions may include dropping a packet, allowing a packet to proceed, forwarding a packet to a specified port, mirroring a packet, modifying the packet, and various others.

SUMMARY OF THE INVENTION

An embodiment of the present invention that is described herein provides a network device including one or more ports, match-action circuitry, and an action processor. The one or more ports are to exchange packets between the network device and a network. The match-action circuitry is to match at least some of the packets to one or more rules so as to set respective actions to be performed, at least one of the actions including a programmable action. The instruction processor is to perform the programmable action by running user-programmable software code. The instruction processor includes architectural registers, one or more of the architectural registers being accessible by the match-action circuitry, and the match-action circuitry is to write into the architectural registers information for performing the programmable action.

In some embodiments, the match-action circuitry is to instruct the instruction processor to perform the programmable action using the information written into the architectural registers. In an example embodiment, the match-action circuitry is to write into the architectural registers at least a value indicative of a start address of the user-programmable software code performing the programmable action.

In some embodiments, the programmable action is a stateful action that depends on state information stored in a memory, and the match-action circuitry is to retrieve the state information from the memory and to write the retrieved state information into the architectural registers. In some embodiments, following completion of the stateful action, the match-action circuitry is to read updated state information from the architectural registers and to save the updated state information in the memory.

In a disclosed embodiment, the match-action circuitry is to perform one or more of the actions that are non-programmable. In an embodiment, the match-action circuitry is to distinguish between programmable actions and non-programmable actions, and to trigger the instruction processor to perform the programmable actions.

In some embodiments, the instruction processor includes an execution pipeline to run the user-programmable software code, and the match-action circuitry is to trigger the execution pipeline after writing the state information to the architectural registers. In an example embodiment, the execution pipeline supports Arithmetic Logic Unit (ALU) operations and flow-control operations, but does not support memory load and store operations. In another embodiment, the execution pipeline supports memory load and store operations.

In an embodiment, the instruction processor includes one or more Reduced Instruction Set Computer (RISC) cores. In an embodiment, the instruction processor includes an internal memory, and is to run the user-programmable code entirely from the internal memory. In another embodiment, the instruction processor is to run the user-programmable code from an external memory, using an instruction cache that is to cache instructions of the user-programmable code.

There is additionally provided, in accordance with an embodiment that is described herein, a method including exchanging packets between a network device and a network. At least some of the packets are matched to one or more rules using match-action circuitry in the network device, so as to set respective actions to be performed. At least one of the actions includes a programmable action. The programmable action is perform by running user-programmable software code on an instruction processor in the network device, including writing, by the match-action circuitry, information for performing the programmable action into one more architectural registers of the instruction or processor that are accessible by the match-action circuitry.

The present invention will be more fully understood from the following detailed description of the embodiments thereof, taken together with the drawings in which:

DETAILED DESCRIPTION OF EMBODIMENTS

Overview

Figure 1:
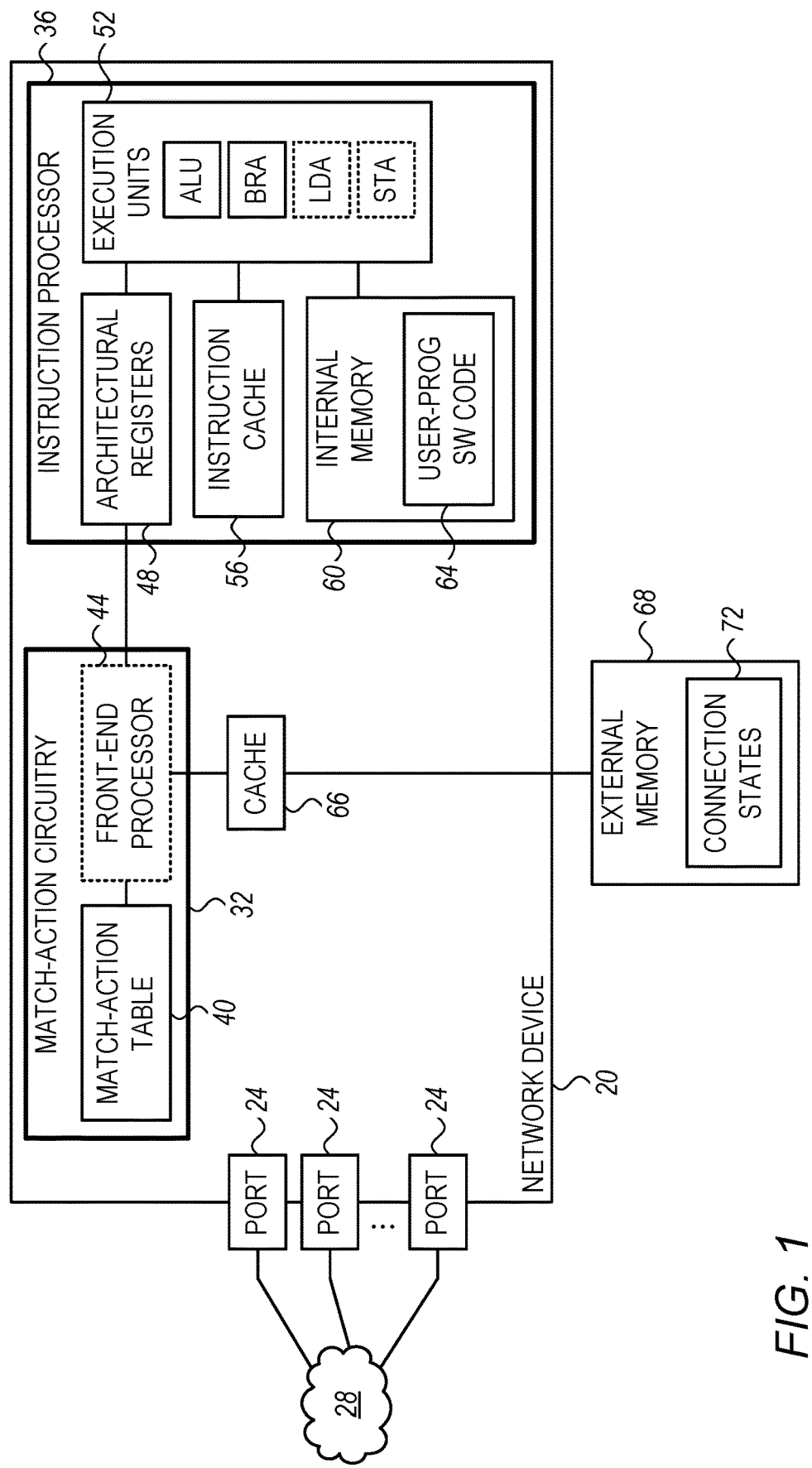
FIG. 1 is a block diagram that schematically illustrates a network device employing programmable action processing, in accordance with an embodiment of the present invention.

Embodiments of the present invention that are described herein provide improved methods and apparatus for match-action processing. The disclosed techniques can be used in various types of network devices, e.g., in network adapters and network switches.

In some embodiments, a network device comprises one or more ports, match-action circuitry, and an instruction processor. The ports are used for sending and receiving packets to and from a network. The match-action circuitry matches at least some of the packets to one or more rules so as to set respective actions. The instruction processor (referred to below as "processor" for brevity) is configured to perform one or more of the specified actions by executing user-programmable software code.

In the present context, an action whose execution involves running software code by the processor is referred to herein as a "programmable action". An action whose execution does not involve running any software code by the processor is referred to herein as a "non-programmable action". The ability to specify at least some of the actions using programmable software is a powerful tool that provides a high degree of flexibility.

In some embodiments, all the possible actions that may be specified by the match-action rules are programmable actions, i.e., have corresponding software code specified for their execution in the processor. In other embodiments, one or more of the actions are non-programmable actions that are executed without involving the processor. In an embodiment, the match-action circuitry also serves as a front-end that distinguishes between programmable and non-programmable actions, executes the non-programmable actions internally, and forwards the programmable actions to the processor for execution.

In some embodiments, the processor's microarchitecture is made highly efficient by sharing one or more of its architectural registers with the match-action circuitry. In these embodiments, the match-action circuitry provides the processor with information for performing a programmable action, by writing the information directly to the shared architectural registers. The information may include, for example, a start address of the software code for performing the action, parameters for performing the action, etc. The match-action circuitry may also read a result of the programmable action from the shared architectural registers of the processor.

By sharing architectural registers with the match-action circuitry, the processor is able to execute an action without having to load data from memory, and to return a result without having to store data in memory. As such, in some embodiments the processor comprises execution units such as an Arithmetic Logic Unit (ALU) and branch unit, but not load or store units. The sharing of architectural registers simplifies the processor's architecture significantly and thus reduces die area. Transferring information via shared registers also reduces action execution time.

In some embodiments, one or more of the programmable actions are stateful actions. In the present context, the term "stateful action" means an action that depends on state information that is stored in memory. The term "stateless action" means an action that does not depend on any stored state information. State information is also referred to as "context".

In an embodiment, the match-action circuitry also serves as a front-end that invokes the processor to execute stateful actions and provides the processor with the required information. In this embodiment, the match-action circuitry retrieves the current state information from the memory and provides the state information to the processor via the shared architectural registers. After the action has been completed, the match-action circuitry reads updated state information from the shared architectural registers and stores the updated state information to the memory.

In an example embodiment, all stateful actions are provided to the processor for execution, and all stateless actions are executed outside the processor, e.g., by the match-action circuitry. Generally, however, some stateful actions may be executed externally to the processor, and some stateless actions may be executed by the processor. In other words, a stateful action is not necessarily a programmable action, and a stateless action is not necessarily a non-programmable action.

Various implementation examples, including network devices that employ the disclosed techniques, and associated methods, are described herein.

System Description

FIG. 1 is a block diagram that schematically illustrates a network device 20 employing programmable action processing, in accordance with an embodiment of the present invention. Network device 20 may comprise, for example, a network adapter (e.g., an Ethernet NIC or an InfiniBand HCA, including "Smart NICs", also referred to as Data Processing Units-DPUs), a switch, a router, a network-attached storage controller, a Graphics Processing Unit (GPU) having networking capabilities, or any other suitable network device.

Network device 20 comprises one or more ports 24 for sending and receiving packets to and from a network 28. Network device 20 and network 28 may operate in accordance with any suitable network protocol, such as Ethernet or InfiniBand™ (IB).

Network device 20 further comprises match-action circuitry 32 and an instruction processor 36. Together, match-action circuitry 32 and processor 36 form a packet-processing pipeline that receives packets, matches the packets to one or more rules, and applies actions that are specified in the rules. A packet-processing pipeline of this sort can be used for ingress processing (processing incoming packets that are received by network device 20) or for egress processing (processing outgoing packets that are transmitted by network device 20).

Some actions may be applied to the packets being matched. Such actions may comprise, for example, dropping a packet, allowing a packet to proceed, forwarding a packet to a specified port 24, modifying a packet, or sending a copy of a packet for analysis. Other actions are associated with the packets being matched but do not affect the packets directly. An example of such an action is incrementing a counter of a connection (e.g., packet flow) to which a packet belongs.

Match-action circuitry 32 comprises a match-action table 40 and, optionally, a front-end processor 44. The functionality of front-end processor 44 is described further below. Table 40 matches packets to one or more rules. A given rule is typically specified over one or more packet attributes (e.g., header fields of the packet and/or metadata associated with the packet) and specifies an action to be performed.

In some embodiments, one or more of the actions specified by the rules of table 40 are performed by processor 36. These actions are referred to herein as "programmable actions". For each type of programmable action, processor 36 holds corresponding user-programmable software code 64 that executes that action.

Additionally or alternatively, one or more of the actions specified by the rules of table 40 are "stateful actions", i.e., actions that depend on state information stored in memory. A typical example of a stateful action is incrementing a counter associated with a connection (e.g., packet flow) to which the matched packet belongs. In this example, the state information for the connection comprises the current counter value, and executing the action involves fetching the current counter value from memory, incrementing the counter value, and writing the updated counter value to memory. A counter may count packets, credits, bandwidth quotas or any other suitable quantity.

Other types of stateful actions include Connection Tracking (CT) and metering. CT aims to identify malicious attacks (e.g., denial-of-service attacks) on the network device, by examining some of the state information of a connection. Packets suspected of being hostile can be dropped rapidly. Metering is a technique that limits the bandwidth for a connection or a group of connections by tracking their cumulative bandwidth. When the bandwidth quota is exceeded, suitable action can be taken, e.g., dropping packets.

In various embodiments, the memory that stores the state information may be internal to network device 20, external to network device 20, or a combination of both. In the example of FIG. 1, network device 20 is coupled to an external memory 68 that stores the state information. In the present example, the state information comprises connection states 72 for one or more connections handled by network device 20. Alternatively, any other suitable type of state information can be used.

In some embodiments, although not necessarily, network device 20 comprises a cache memory 66. Cache memory 66 is located between front-end processor 44 and external memory 68, and caches at least part of the state information. In the present context, phrases such as "fetching state information from external memory" and "storing state information to external memory" include fetching and storing information in cache 66.

In the example of FIG. 1, processor 36 comprises an execution pipeline comprising, inter alia, a set of architectural registers 48 and a plurality of execution units 52. Architectural registers 48 are also referred to as Instruction Set Architecture (ISA) registers. Execution units 52 may comprise, for example, one or more Arithmetic Logic Units (ALU), one or more branch units (BRA), one or more load units (LDA) and one or more store units (STA). Processor 36 may further comprise an instruction cache 56, and an internal memory 60 that stores user-programmable software code 64. Instruction cache 56 is used for caching program instructions, in embodiments in which some of the program code of processor 36 is stored in external memory 68 and should be held closer for fast execution. If all the program code of processor 36 is stored in internal memory 60, instruction cache 56 can be omitted while still achieving good performance.

Processor 36 is invoked by match-action circuitry 32 to execute programmable actions. Typically, memory 60 stores a suitable software code 64 for each programmable action supported by processor 36. When invoked to execute a certain programmable action, processor 36 executes the corresponding software code 60 using registers 48 and execution units 52.

In some embodiments, network device 20 comprises a user interface (e.g., Application Programming Interface-API) that enables end users to modify and load user-programmable software code 64. In other embodiments, user-programmable software code 64 is loaded in advance to the network device and cannot be modified by end users. In the latter case, the term "user" refers to a designer or manufacturer of the network device.

In some embodiments, processor 36 comprises one or more Reduced Instruction Set Computer (RISC) cores (e.g., cores supporting the RISC-V ISA). In an embodiment, processor 36 comprises multiple RISC cores operating in parallel. Each RISC core comprises at least a respective execution pipeline (e.g., architectural registers 48 and execution units 52 as seen in FIG. 1). This implementation enables processor 36 to execute multiple programmable actions in parallel. Alternatively, any other suitable type of processor can be used.

In some embodiments, processor 36 runs program code 64 entirely from internal memory 60 in order to avoid delays that may occur in accessing external memory. Even if access to the external memory is via a cache (e.g., instruction cache 56), delays may occur, e.g., on cache miss events. In alternative embodiments, the latency of accessing external memory 68 is sufficiently small, and processor 36 runs program code 64 from external memory 68 (typically via instruction cache 56).

The configuration of network device 20, as shown in FIG. 1, is an example configuration that is chosen purely for the sake of conceptual clarity. In alternative embodiments, any other suitable configuration can be used. Elements that are not necessary for understanding the principles of the present invention, such as various interfaces, addressing circuits, timing and sequencing circuits and debugging circuits, have been omitted from the figures for clarity.

The various elements of network device 20 may be implemented in hardware, e.g., in one or more Application-Specific Integrated Circuits (ASICs) or FPGAs. Additionally or alternatively, elements of network device 20 may be implemented using software, or using a combination of hardware and software elements.

In some embodiments, processor 36 may be implemented, in part or in full, using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Execution of Programmable Actions Using Shared Architectural Registers

In some embodiments, one or more (e.g., all) of architectural registers 48 of processor 36 are shared with match-action circuitry 44. In the present context, the term "shared register" means that match-action circuitry is able to write data directly into the register and to read data directly from the register. Sharing of architectural registers is a novel and highly efficient mechanism, enabling processor 36 to execute programmable actions without having to interact with external memory 68.

In an example embodiment, the total number of shared registers is thirty-two, and each shared register is a 64-bit register. In this example, the total data size available for transferring information using the shared registers is 256 bytes. Alternatively, any other suitable numbers and sizes can be used.

In some embodiments, execution units 52 do not include any LDA or STA units. In an example implementation of this sort, execution units 52 comprise only ALU and BRA units. In such embodiments, processor 36 is able to execute programmable actions, including receiving all the necessary information and returning results, without any access to external memory 68. This sort of implementation, however, is in no way mandatory. In alternative embodiments, execution units 52 do include one or more LDA and/or STA units. These LDA and/or STA using can be used to access external memory 68, e.g., for reading information (state information or other) for executing programmable actions and/or for storing results (updated state information or other) of programmable actions.

In a typical implementation, match-action circuitry 32 instructs processor 36 to execute a certain programmable action by (i) writing information required for performing the programmable action into the shared registers, and (ii) triggering processor 36 to execute the programmable action. The information written to the shared registers may comprise, for example, one or more of the following:

- An opcode identifying the action to be executed.
- A value indicative of the start address of the user-programmed software code 64 that executes the action.
- One or more attributes (e.g., values of header fields) taken from the packet.

Metadata relating to the packet or to the action.

State information (to be elaborated below).

Any other suitable information.

In some embodiments, the write operation (writing of the information into the shared registers) also serves as the trigger that causes processor 36 to start executing the programmable action. In other embodiments, match-action circuitry 32 uses a separate interface (e.g., interrupt) for triggering the processor after the information has been written to the shared registers.

In some embodiments, processor 36 produces a result (also referred to as "return value") upon completing the programmable action. Match-action circuitry 32 may read the result ("return value") directly from one or more of the shared registers. The result may be written to external memory. Additionally or alternatively, the result may be fed back to match-action table 40, e.g., for updating one or more of the rules. In some embodiments, processor 36 may modify the values of any of the shared registers while executing the program code. When execution is completed, the final values of the registers can be read as results by match-action circuitry 32.

Figure 2:
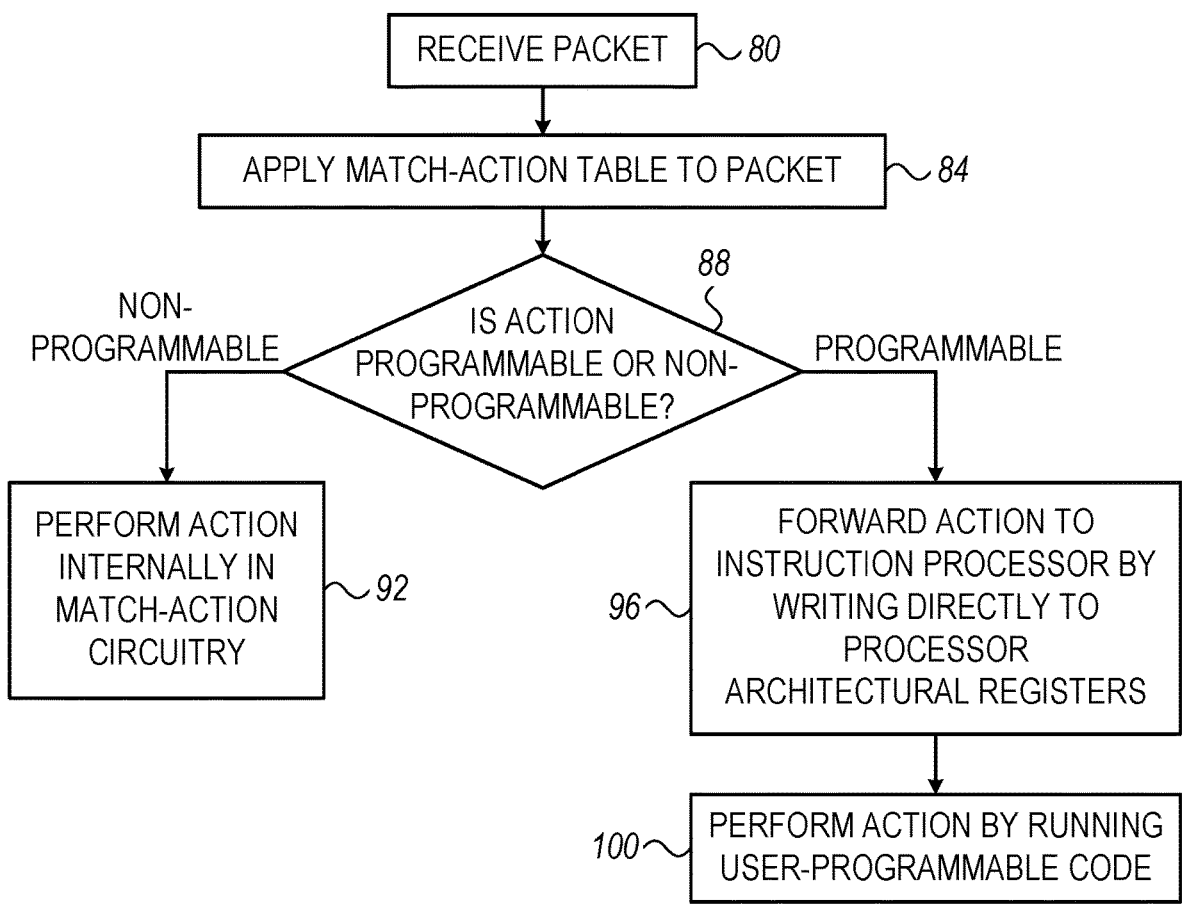
FIGS. 2 and 3 are flow charts that schematically illustrate methods for match-action processing, in accordance with embodiments of the present invention.

FIG. 2 is a flow chart that schematically illustrate a method for match-action processing in network device 20, in accordance with an embodiment of the present invention. The method begins with network device 20 receiving a packet via one of ports 24, at a packet reception stage 80. At a matching stage 84, match-action circuitry 32 compares the attributes of the received packet to the rules of match-action table 40. Assuming a match is found, the matching rule specifies an action.

At an action checking stage 88, front-end processor 44 checks whether the action is a programmable action or a non-programmable action. If the action is a non-programmable action, front-end processor 44 executes the action, at a non-programmable action execution stage 92.

If the action is a programmable action, front-end processor 44 instructs processor 36 to execute the action, at a programmable action forwarding stage 96. Typically, front-end processor 44 writes the information required for performing the programmable action into the shared registers. At a programmable action execution stage 100, processor 36 executes the programmable action by running the appropriate user-programmable software code 64 using the information written to the shared registers.

Figure 3:
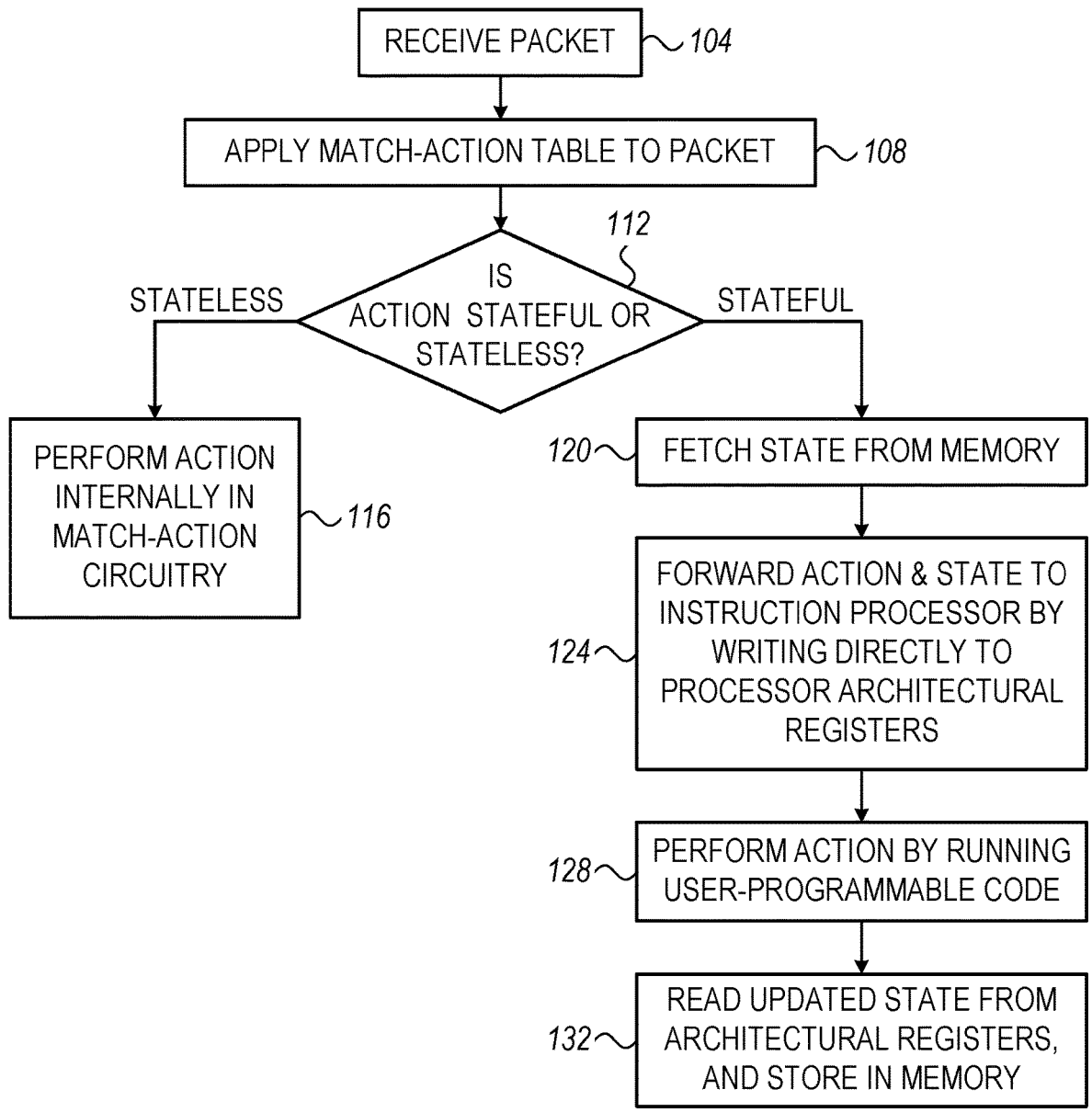

FIG. 3 is a flow chart that schematically illustrate a method for match-action processing, in accordance with another embodiment of the present invention. The method of FIG. 3 focuses on an example embodiment in which (i) stateful actions are performed by processor 36 and (ii) stateless actions are performed by match-action circuitry 32. This partitioning, however, is in no way mandatory. In alternative embodiments, (i) some or all stateless actions may be performed by processor 36 and (ii) some or all stateful actions may performed by match-action circuitry 32.

The method of FIG. 3 begins with network device 20 receiving a packet via one of ports 24, at a packet reception stage 104. At a matching stage 108, match-action circuitry 32 compares the attributes of the received packet to the rules of match-action table 40. Assuming a match is found, the matching rule specifies an action.

At an action checking stage 112, front-end processor 44 checks whether the action is stateful or stateless. If the action is stateless, front-end processor 44 may execute the action, at a stateless action execution stage 116.

If the action is stateful, front-end processor 44 fetches the relevant state information from external memory 68, at a state fetching stage 120. When the action is a programmable action, front-end processor 44 then forwards the state information, plus any other information needed for performing the stateful action, to processor 36, at a stateful action forwarding stage 124. As explained above, front-end processor 44 writes the state information and other required information into the shared registers. In one example, the data size of the state information is sixty-four bytes, occupying eight 64-bit registers. Alternatively, the state information may have any other suitable size.

At a stateful action execution stage 128, processor 36 executes the stateful action by running the appropriate user-programmable software code 64 using the information written to the shared registers. Processor 36 may use the registers to execute the program, sometimes by modifying their contents. However, as part of the program, the processor writes the updated state information to the shared registers.

At a state updating stage 132, front-end processor 44 reads the updated state information from the shared registers and stores the updated state information in external memory 68.

Although the embodiments described herein mainly address match-action processing in devices such as switches and network adapters, the methods and systems described herein can also be used in other applications, such as in match-action processing in security applications (e.g., IPsec), in gateways and in network partitioning.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network device, comprising:
   one or more ports, to exchange packets between the network device and a network;
   match-action circuitry, to match at least some of the packets to one or more rules so as to set respective actions to be performed, wherein at least one of the actions comprises a programmable action; and
   an instruction processor, to perform the programmable action by running user-programmable software code,
   wherein the instruction processor comprises architectural registers, one or more of the architectural registers being accessible by the match-action circuitry, and
   wherein the match-action circuitry is to write into the architectural registers information for performing the programmable action, the information comprising at least a value indicative of a start address of the user-programmable software code performing the programmable action.

2. The network device according to claim 1, wherein the match-action circuitry is to instruct the instruction processor to perform the programmable action using the information written into the architectural registers.

3. The network device according to claim 1, wherein the match-action circuitry is to perform one or more of the actions that are non-programmable.

4. The network device according to claim 1, wherein the match-action circuitry is to distinguish between programmable actions and non-programmable actions, and to trigger the instruction processor to perform the programmable actions.

5. The network device according to claim 1, wherein the instruction processor comprises one or more Reduced Instruction Set Computer (RISC) cores.

6. The network device according to claim 1, wherein the instruction processor comprises an internal memory, and is to run the user-programmable code entirely from the internal memory.

7. The network device according to claim 1, wherein the instruction processor is to run the user-programmable code from an external memory, using an instruction cache that is to cache instructions of the user-programmable code.

8. A network device, comprising:
one or more ports, to exchange packets between the network device and a network;
match-action circuitry, to match at least some of the packets to one or more rules so as to set respective actions to be performed, wherein at least one of the actions comprises a programmable action; and
an instruction processor, to perform the programmable action by running user-programmable software code,
wherein the instruction processor comprises architectural registers, one or more of the architectural registers being accessible by the match-action circuitry,
wherein the match-action circuitry is to write into the architectural registers information for performing the programmable action,
wherein the instruction processor comprises an execution pipeline to run the user-programmable software code, and wherein the match-action circuitry is to trigger the execution pipeline after writing state information to the architectural registers.

9. The network device according to claim 8, wherein the execution pipeline supports Arithmetic Logic Unit (ALU) operations and flow-control operations, but does not support memory load and store operations.

10. The network device according to claim 8, wherein the execution pipeline supports memory load and store operations.

11. A method, comprising:
exchanging packets between a network device and a network;
matching at least some of the packets to one or more rules using match-action circuitry in the network device, so as to set respective actions to be performed, wherein at least one of the actions comprises a programmable action; and
performing the programmable action by running user-programmable software code on an instruction processor in the network device, including writing, by the match-action circuitry, information for performing the programmable action into one or more architectural registers of the instruction processor that are accessible by the match-action circuitry, the information comprising at least a value indicative of a start address of the user-programmable software code performing the programmable action.

12. The method according to claim 11, and comprising, using the match-action circuitry, distinguishing between programmable actions and non-programmable actions, and triggering the instruction processor to perform the programmable actions.

13. A method, comprising:
exchanging packets between a network device and a network;
matching at least some of the packets to one or more rules using match-action circuitry in the network device, so as to set respective actions to be performed, wherein at least one of the actions comprises a programmable action; and
performing the programmable action by running user-programmable software code on an instruction processor in the network device, including writing, by the match-action circuitry, information for performing the programmable action into one or more architectural registers of the instruction processor that are accessible by the match-action circuitry,
wherein performing the programmable action comprises, using the match-action circuitry, triggering an execution pipeline of the instruction processor after writing state information to the architectural registers.

14. The method according to claim 13, wherein the execution pipeline supports Arithmetic Logic Unit (ALU) operations and flow-control operations, but does not support memory load and store operations.

15. A network device, comprising:
one or more ports, to exchange packets between the network device and a network;
match-action circuitry, to match at least some of the packets to one or more rules so as to set respective actions to be performed, wherein at least one of the actions comprises a stateful programmable action that depends on state information stored in a memory; and
an instruction processor, to perform the stateful programmable action by running user-programmable software code,
wherein the instruction processor comprises architectural registers, one or more of the architectural registers being accessible by the match-action circuitry, and
wherein the match-action circuitry is to retrieve the state information from the memory and to write the retrieved state information into the architectural registers, for performing the stateful programmable action.

16. The network device according to claim 15, wherein, following the completion of the stateful programmable action, the match-action circuitry is to read updated state information from the architectural registers and to save the updated state information in the memory.

17. A method, comprising:
exchanging packets between a network device and a network;
matching at least some of the packets to one or more rules using match-action circuitry in the network device, so as to set respective actions to be performed, wherein at least one of the actions comprises a stateful programmable action that depends on state information stored in a memory;
using the match-action circuitry, retrieving the state information from the memory and writing the retrieved state information into one or more architectural registers of an instruction processor in the network device, for performing the programmable action; and
performing the stateful programmable action by running the user-programmable software code on the instruction processor.

18. The method according to claim 17, and comprising, following completion of the stateful action, reading updated state information from the architectural registers by the match-action circuitry, and saving the updated state information in the memory.

\* \* \* \* \*